No. 620,402. Patented Feb. 28, 1899.
P. ANDERSON.
PROCESS OF THAWING FROZEN GROUND.
(Application filed Feb. 23, 1898.)
(No Model.)
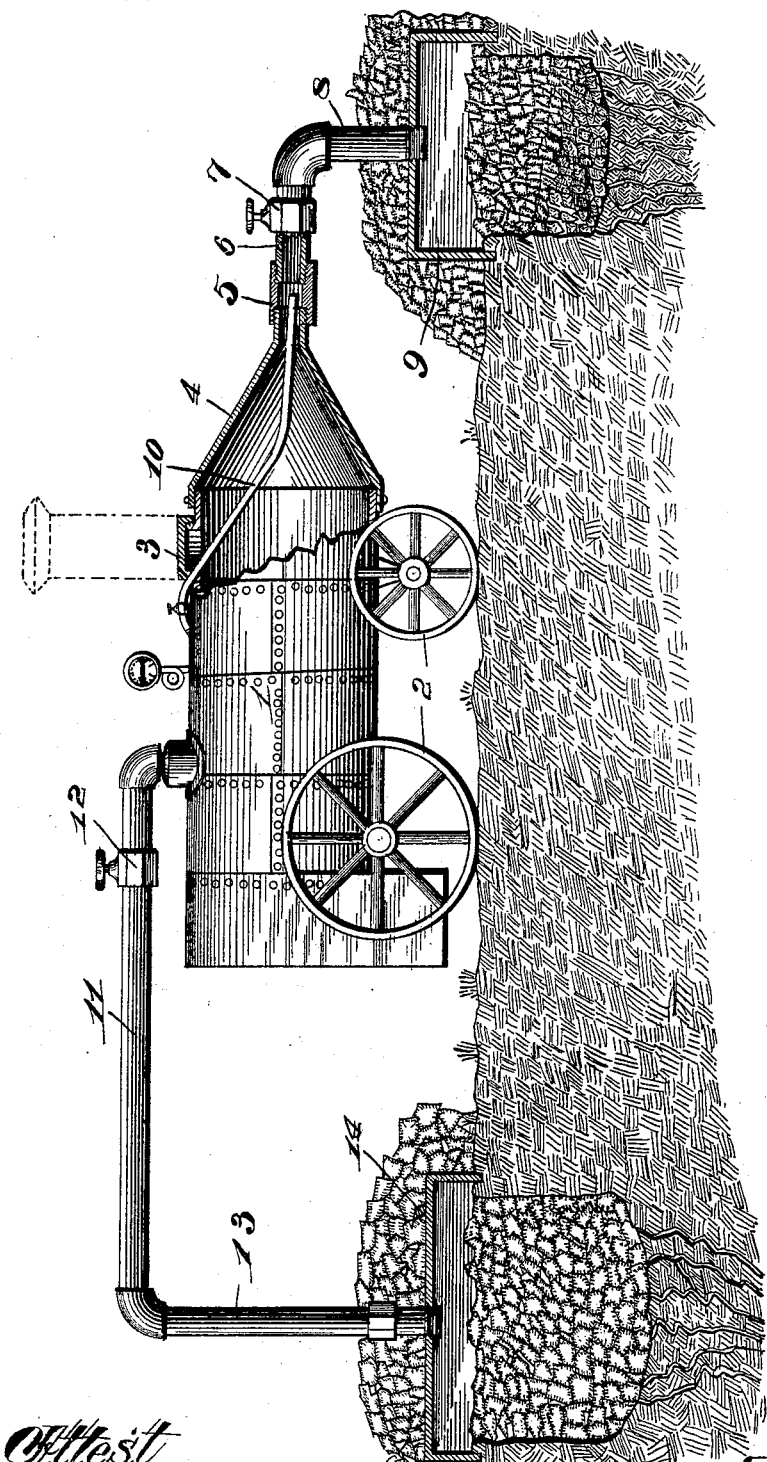

UNITED STATES PATENT OFFICE.

PETER ANDERSON, OF XENIA, ILLINOIS.

PROCESS OF THAWING FROZEN GROUND.

SPECIFICATION forming part of Letters Patent No. 620,402, dated February 28, 1899.

Application filed February 23, 1898. Serial No. 671,375. (No model.)

*To all whom it may concern:*

Be it known that I, PETER ANDERSON, of the city of Xenia, Clay county, State of Illinois, have invented certain new and useful Improvements in Processes of Thawing Frozen Ground, of which the following is a full, clear, and exact description, reference being had to the accompanying drawing, forming a part hereof.
My invention relates to a process for thawing frozen ground.

The drawing is a side elevation of a device or apparatus used in carrying out my invention, portion being in section to more clearly illustrate the same.

Referring by numerals to the accompanying drawing, 1 indicates a horizontal boiler that is arranged for transportation upon suitable traction-wheels 2, and when my improved apparatus is in use the smoke-stack of said boiler is taken off and a cap 3 normally closes the opening into said stack. This boiler 1 is of the ordinary construction and is fitted with all of the various gages and other devices usually employed upon a boiler of this kind.

Rigidly secured to the forward end of the boiler is a conical shell 4, to the outer end of which is removably fixed a union 5, and in the opposite end of which is removably fixed one end of a horizontal length of pipe 6, in which length of pipe is located a suitable cut-off valve 7. From the outer end of the horizontal length of pipe 6 depends a pipe 8, the same being connected to said pipe 6 by an ordinary elbow, and the lower end of said pipe 8 is secured to and discharges into a rectangular open-bottomed box 9 of suitable size and construction.

A blower 10 comprises a length of pipe leading from the steam-chamber within the boiler 1, through the conical shell 4, and into the forward end of the length of pipe 6, said blower being similar to the blowers ordinarily employed upon boilers of this kind to assist the draft.

Leading from the steam-chamber of the boiler 1 is a pipe 11, in which is suitably located an ordinary cut-off valve 12, and connected to the outer end of said pipe 11 by means of an ordinary elbow is a length of vertically-arranged pipe 13, the lower end of which is connected to and discharges into a rectangular open-bottomed box 14.

The practical operation of my process is as follows: A shallow hole is dug in the frozen ground that it is desired to thaw and a charge of dynamite or like explosive is located in the bottom of said hole and exploded in any suitable manner. When said explosion takes place, the hole will be necessarily somewhat enlarged, and numerous cracks and interstices will be formed in the adjacent frozen ground, which cracks and interstices extend downwardly and outwardly in various directions. A portion of the dirt or soil that was removed in digging the shallow hole is now thrown into said hole and either one of the boxes 9 or 14 located immediately over said hole. The box is now covered with the remaining portion of the soil that was originally removed from the hole. Should it be desired to thaw the earth out at two adjacent points, both boxes are made use of after two holes have been dug and charges exploded in each hole. The boiler is now fired up, and as steam is generated within said boiler it will pass through the pipes 11 and 13 into the box 14, and as the steam-pressure rises within the boiler the steam thus passing into the box 14 will be forced downwardly through the loose dirt or soil within the hole below said box and said steam will pass into the cracks and interstices formed by the explosion in said hole, and thus thaw out the adjacent ground.

When the box 9 is made use of, the valve 7 in the pipe 6 is opened, and the valve in the blower 10 is also opened, and said blower will cause the heat, smoke, and like products of combustion arising from the fire within the boiler to pass through the pipes 6 and 8 into the box 9, and from thence downwardly into the cracks and interstices in the ground that is covered by said box 9. Thus it will be seen how I have provided a simple, efficient, and inexpensive process of thawing frozen ground, which process can be cheaply used where it is desired to sink a mining-shaft or tunnel where the ground is frozen or where it is desired to excavate for buildings, sewers, &c., during the season when the ground is frozen.

When the box 9 and connections leading thereto are not being used, a cap may be located upon the end of the conical shell 4, and the cap 3 is removed and the smoke-stack positioned upon the boiler.

I have found by actual practice and demonstration that the outwardly and downwardly extending cracks are formed in the frozen ground immediately below where the explosion of dynamite or like explosive takes place.

I claim—

1. The herein-described process of thawing frozen ground, which consists in first placing a charge of explosive material upon the ground and exploding the same then placing an open-bottomed box over the depression caused by the explosion and forcing heat into said box from a suitably-located generator, substantially as specified.

2. The herein-described process of thawing frozen ground, which consists in first forming a shallow hole in the ground, then placing a charge of explosive material in said hole and exploding the same, then filling said hole with loose earth, then placing the open-bottomed box over said hole, then covering said box with soil and then forcing heat into said box from a suitably-located generator, substantially as specified.

In testimony whereof I affix my signature in presence of two witnesses.

PETER ANDERSON.

Witnesses:
  T. E. KELLER,
  T. C. TADLOCK.